A. B. CREHORE.
AUTOMOBILE CARD INDEX SYSTEM.
APPLICATION FILED MAR. 17, 1920.
1,373,171.
Patented Mar. 29, 1921.
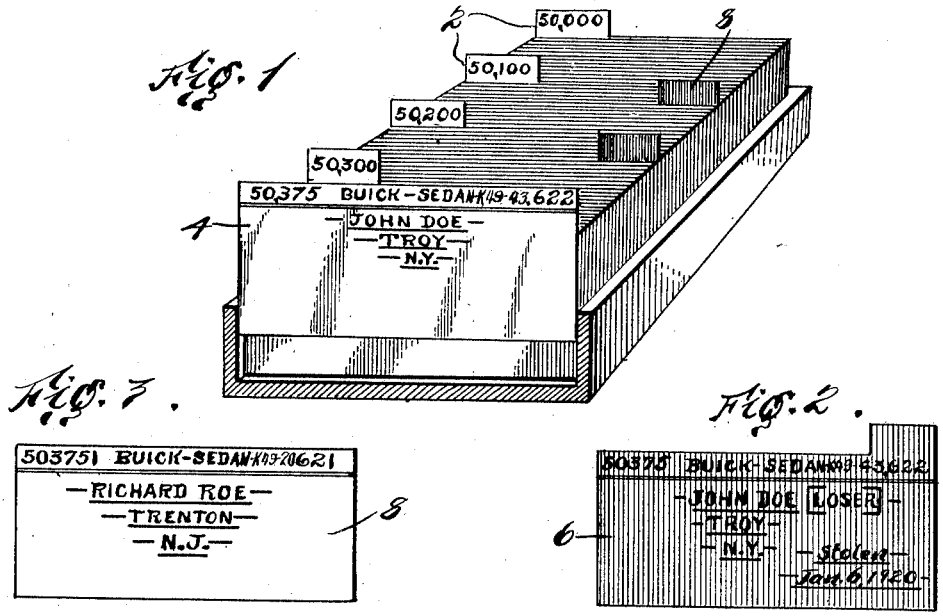
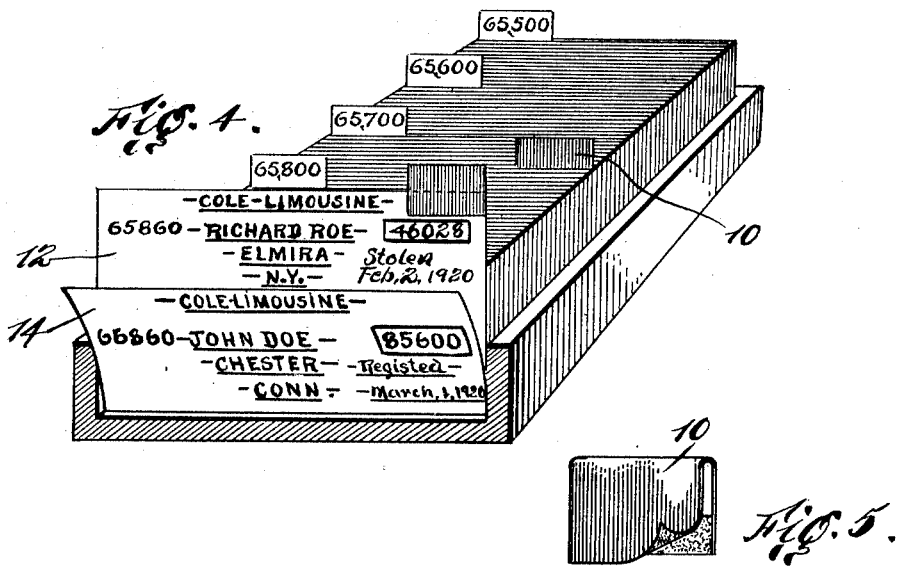
Inventor
Austen B. Crehore.
By his Attorney
Emerson R. Newell

UNITED STATES PATENT OFFICE.

AUSTEN B. CREHORE, OF WESTFIELD, NEW JERSEY.

AUTOMOBILE CARD-INDEX SYSTEM.

1,373,171.  Specification of Letters Patent.  Patented Mar. 29, 1921.

Application filed March 17, 1920. Serial No. 366,532.

*To all whom it may concern:*

Be it known that I, AUSTEN B. CREHORE, a citizen of the United States, residing at Westfield, New Jersey, have invented certain new and useful Improvements in Automobile Card-Index Systems, of which the following is a clear, full, and exact description.

This invention relates to the detection and location of stolen automobiles, and has for its general object the provision of means for quickly and readily determining from suitably arranged obtainable records, the location of stolen automobiles that have been re-registered, the probability that certain registered automobiles have been stolen, and, in general, quickly and positively to keep a check on transfers of automobiles, whether legal or fradulent.

Up to the present time, no systematic effort has apparently been made to provide means whereby stolen automobiles can readily be located and recovered, neither the police authorities, the companies which insure against automobile thefts, nor the State registration bureaus having any effective means by which a stolen automobile can readily be located. The present invention aims to provide such means, and to this end takes advantage of certain common characteristics of the histories of most cars that are stolen, of universal means for identifying automobiles, which at the present time is by the motor numbers, and of public records of existing cars, to provide a card index in which the contemporaneous location of any car of any particular make, either within a certain area or anywhere, will immediately be indicated, provided the car is registered under its real motor number; in which the known limits of the motor numbers of the particular make of car will immediately show a change of motor number either by duplication within the limits or location outside of the limits, and in which, by means of suitable distinguishing cards, cars of the particular make that have been stolen will be indicated, thus calling attention when a stolen car is re-registered, to the fact that the transfer is probably fradulent.

That such means for recovering stolen automobiles is both new and useful has been demonstrated by remarkable results with a comparatively restricted embodiment of the invention and with increasing results as the scope of the means for keeping a check on automobile transfers has been enlarged both territorially and as to the number of makes of cars with respect to which such a check is maintained.

In carrying out the invention, I provide separate series of cards for the respective makes of automobiles covered by the index, and arrange the cards of each series in the order of the distinctive identifying automobile numbers which, at the present time and substantially universally, are the motor numbers, and upon each card in addition to the motor number I place the name and address of the person in whose name the car is registered and such appropriate information contemporaneous to the registration as will readily show the time of registration or at least the relative time of registration, as, for example, the registration number. The address of the registrant will usually locate the State in which the registration has been effected, but this of course can be a part of the registration information, particularly in cases where the residence and the State of registration are different.

This index, with the cards arranged in the manner above set forth, is maintained in substantially contemporaneous condition as to registration, by inserting in the appropriate positions as to motor numbers, cards showing respectively both registrations of new cars and re-registration of cars already indexed, the index preferably showing the known limits of the motor numbers for the respective makes, that is, approximately the current maximum for each make and the lowest and highest number for each type of that make. Within this index, whenever a car is reported stolen, there is preferably inserted adjacent to the card having the motor number of the stolen car, a distinctive card containing such information as to the theft as will facilitate recovery of the car, such, for example, as the date or the approximate date when the car was stolen and preferably the place. In place of a separate card, a tab or other mark may be placed on the original card and the information placed upon this card.

Such an index is shown in the accompanying drawings in which

Figure 1 is a perspective view of a portion of a card index embodying the present invention such as would be employed in connection with the recovering of Buick automobiles;

Fig. 2 is a view of one of the distinctive cards which are placed in the index at the appropriate locations to indicate cars which have been stolen;

Fig. 3 is a view showing a registration card having thereon a motor number which has been so changed that it comes outside the existing series;

Fig. 4 is a perspective view of an index for another make of automobiles, such, for example, as the Cole, this index having slight modifications in structure, and this view also showing a card indicating a later registration of a car of which the number has been changed by changing one of the existing digits;

Fig. 5 illustrates a type of distinctive tab that may be used in place of a distinctive card for indicating stolen or lost cars.

In Fig. 1 the cards are shown as arranged in the order of the motor numbers, the tabs 2 upon the cards indicating the hundreds for convenient location of a number, as is common in card indexes, and the card 4 fully shown at one end of the sectioned tray showing the information which is preferably placed upon the card, namely the motor number in the upper left-hand corner, the State registration number in the upper right-hand corner, the type of car at the top, and the name and address of the owner and registrant.

In this index, distinctive cards 6, such as shown in Fig. 2, are preferably used to indicate the stolen cars, these cards having their tabs 8 preferably located at the right. From Fig. 3 it will be seen that the car shown on the card 4 in Fig. 1, which was reported stolen on the card 6 in Fig. 2, has been re-registered and is about to be added to the index by means of the card 8 in Fig. 3. The digit 1 has, however, been added to the original motor number, as shown in the upper left-hand corner of the card 8, and thus no place is found for the card in the index. An examination of the reports of stolen cars immediately calls attention to the fact that this number has been made by adding the digit 1 to the motor number of the car reported stolen on card 6 in Fig. 2.

In the index shown in Fig. 4, the stolen or lost cars are preferably indicated by pasting a tab upon a different place upon the card than the normal tab and adding information as to loss of the car to the original card in the index. A tab 10 suitable for this purpose is shown at Fig. 5 and is of well-known construction.

In this index, the Cole car having the motor number 65860, indexed on card 12, has been reported stolen as indicated by the tab upon the upper right-hand corner of this card and the information added to the card below the tab, and later a car apparently having the motor number 66860 is registered and the registration entered upon the card 14 to be placed in the index. It is found, however, that there is in the index already a card for this car, and if investigation shows that this car is not reported stolen and in fact is still in the possession of the owner indicated on the card, then an examination of the cards indicating stolen cars will readily show the similarity between the number on card 12 and the number on card 14 and the fact that the number on card 14 has doubtless been produced by changing the digit 5 of the motor number to 6.

When a car is reported stolen, a distinctive card having the motor number of the stolen car, the name and address of the party from whom stolen, the date when stolen, and preferably the place where stolen, is preferably inserted at the place in the index where this motor number belongs, this being naturally adjacent to the card already in the index having a corresponding motor number thereon, and if desired, the two cards may be fastened together in any convenient manner, or, as above suggested, the information may be placed upon the original card and a marker attached thereto. As car transfers are added to the index, the transfer of the stolen car to some other party will appear in the index when the car is registered by the new pseudo owner, and if the motor number has been retained, the new registration will go into the index adjacent to the distinctive card indicating that the car has been stolen, and, being of a date subsequent to the stealing of the car, will indicate the present location of the stolen car. If the thief has changed the motor number, then one of the following things will usually happen: If the change has been made by changing one of the digits of the existing number as, for example, by completing one of the loops of the digit 3 and making a 9, this being a common change effected by automobile thieves, the number may still be within the range of the existing motor numbers of the particular make of car, but it will obviously be a duplicate of the number of another motor of this make, and this duplication will appear when it is attempted to insert the card in the index. Reference will then be made to the distinctive cards showing stolen automobiles and the change in the number effected by the thief will usually be apparent.

If the thief has changed the number by adding a digit to one end or the other of the existing motor number, this will ordinarily throw the number outside the range of existing numbers. In this connection it might be stated that the cards will preferably have, in addition to the motor numbers, indications of the type of car or motor within certain ranges of numbers, the type information being preferably also put upon the distinctive card showing a stolen automobile. By taking a number which has been made by adding a digit to one end or the other of the original motor number and comparing it with the motor numbers of the make and type, it will usually be at once seen to which end of the original number the digit has been added, and by leaving off this digit, the original number will be obtained and will usually correspond to some car in the index which has been reported stolen. In this connection I might state, however, that in my use of this index I have found in this manner a car which had been stolen but had not been reported stolen, the car having been insured, the insurance company having paid the owner the insurance, and the owner having purchased another car without himself making an effort to recover the stolen car, and the insurance company apparently having made no serious effort to recover the stolen car. It will thus be seen that the index sometimes uncovers facts which are not of public record.

What I claim as new is:

1. A card index for detecting and locating stolen automobiles, comprising separate series of cards for the respective makes of automobiles covered by the index, each series of cards being arranged in the order of the motor numbers, and each card having thereon, in addition to the motor number, the name and address of the person in whose name the car is registered and appropriate information contemporaneous to the registration.

2. A card index for detecting and locating stolen automobiles, comprising separate series of cards for the respective makes of automobiles covered by the index, each series of cards being arranged in the order of the motor numbers and showing the known limits of motor numbers for that make, and each card having thereon, in addition to the motor number, the name and address of the person in whose name the car is registered and appropriate information contemporaneous to the registration.

3. A card index for detecting and locating stolen automobiles, comprising separate series of cards for the respective makes of automobiles covered by the index, each series of cards being arranged in the order of the motor numbers, and each card having thereon, in addition to the motor number, the name and address of the person in whose name the car is registered and appropriate contemporaneous registration information, said index having therein—in the appropriate locations determined by the motor numbers thereof—distinctive cards having thereon reports of thefts of automobiles, each such card having also thereon the date or approximate date when the automobile was stolen.

4. A card index for detecting and locating stolen automobiles, comprising separate series of cards for the respective makes of automobiles covered by the index, each series of cards being arranged in the order of the motor numbers, and each card having thereon, in addition to the motor number, the name and address of the person in whose name the car is registered and appropriate contemporaneous registration information, said index being adapted to be maintained in substantially contemporaneous condition as to registration by inserting in the appropriate positions as to motor numbers cards showing respectively both registrations of new cars and reregistrations of cars already indexed, within the known limits of the motor numbers for the respective makes, thereby providing for the detection both of changes of motor numbers and of transfers of automobiles without such change of number.

5. A card index for detecting and locating stolen automobiles, comprising separate series of cards for the respective makes of automobiles covered by the index, each series of cards being arranged in the order of the motor numbers, and each card having thereon, in addition to the motor number, the name and address of the person in whose name the car is registered and appropriate contemporaneous registration information, said index having therein—in the appropriate locations determined by the motor numbers thereof—distinctive cards having thereon reports of thefts of automobiles, each such card having also thereon the date or approximate date when the automobile was stolen, said index being adapted to be maintained in substantially contemporaneous condition as to registration by inserting in the appropriate positions as to motor numbers cards showing respectively both registrations of new cars and reregistrations of cars already indexed, within the known limits of the motor numbers for the respective makes, thereby providing for the detection both of changes of motor numbers and of transfers of automobiles without such change of number.

Signed at New York city this 13th day of March, 1920.

AUSTEN B. CREHORE.